Figure 1:
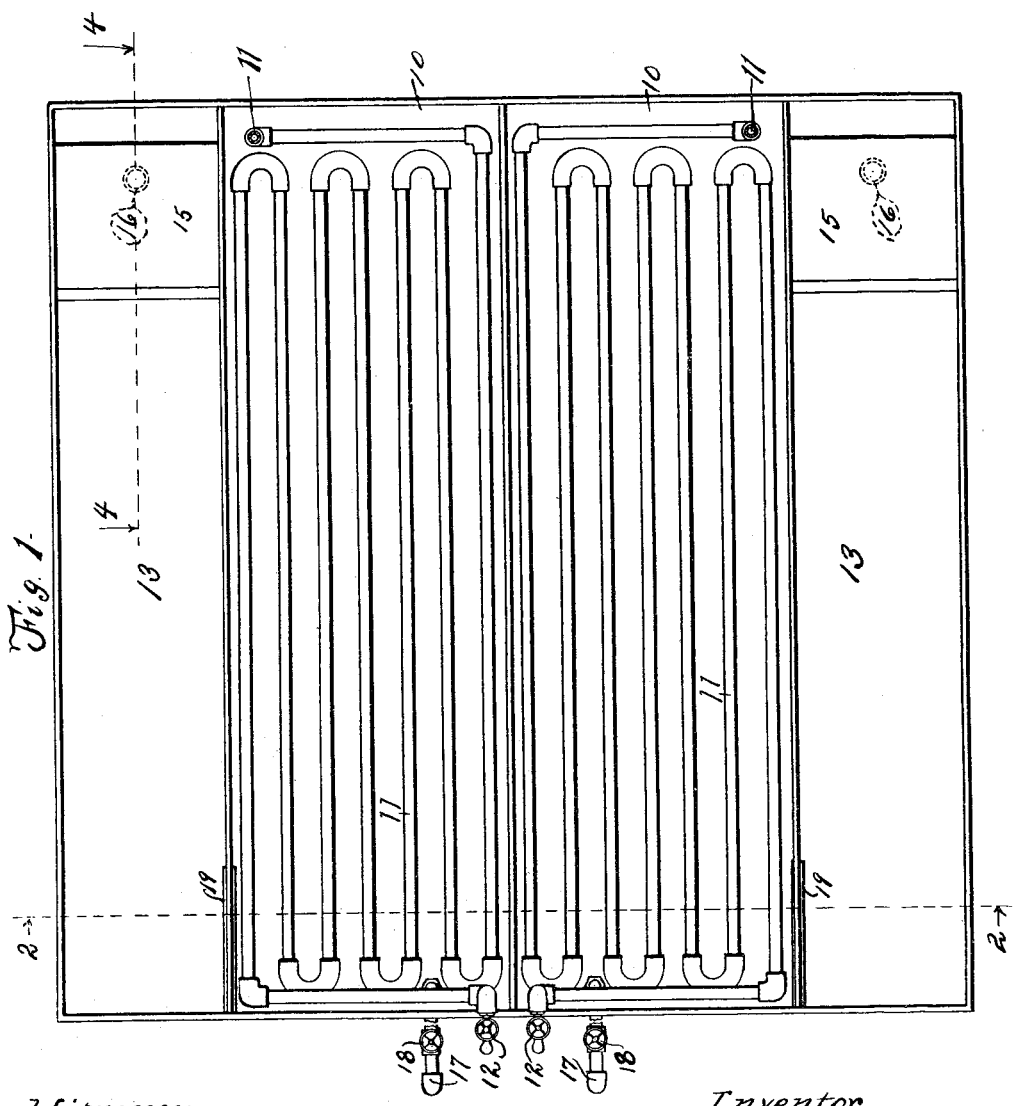

M. B. CRESSWELL.
FINISHING EVAPORATOR.
APPLICATION FILED NOV. 25, 1911.

1,075,630.

Patented Oct. 14, 1913.
2 SHEETS—SHEET 1.

Witnesses;
Erle W. Miller
Earl M. Sinclair

Inventor
Milton B. Cresswell

M. B. CRESSWELL.
FINISHING EVAPORATOR.
APPLICATION FILED NOV. 25, 1911.
1,075,630.
Patented Oct. 14, 1913.
2 SHEETS—SHEET 2.
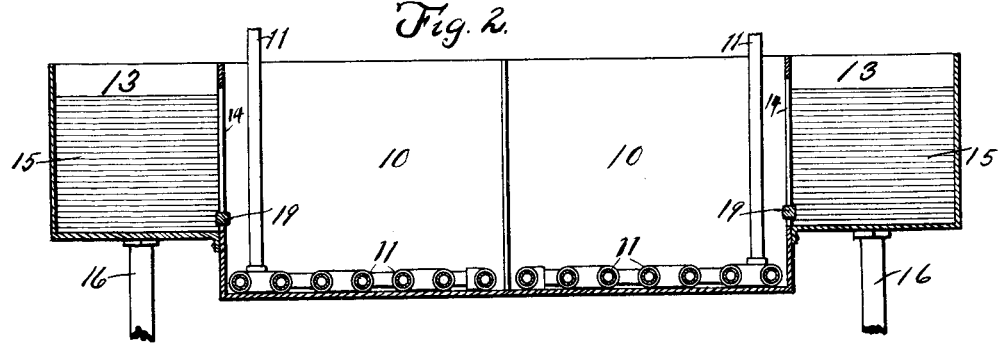
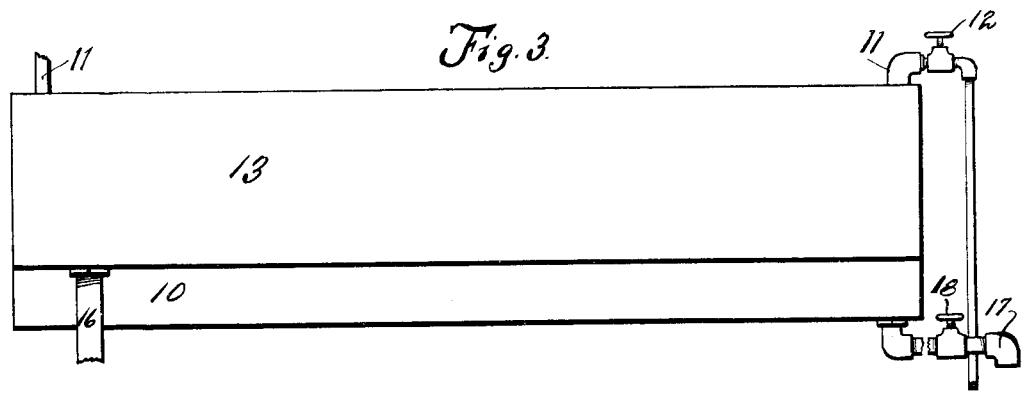
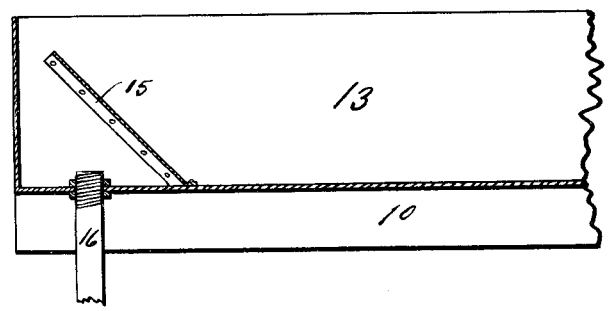
Witnesses:
Inventor.

UNITED STATES PATENT OFFICE.

MILTON B. CRESSWELL, OF DES MOINES, IOWA.

FINISHING-EVAPORATOR.

1,075,630. Specification of Letters Patent. Patented Oct. 14, 1913.

Application filed November 25, 1911. Serial No. 662,441.

*To all whom it may concern:*

Be it known that I, MILTON B. CRESSWELL, a citizen of the United States of America, and resident of Des Moines, Polk county, Iowa, have invented a new and useful Finishing-Evaporator, of which the following is a specification.

The object of this invention is to provide an improved apparatus for refining and finishing sorghum syrup and other saccharine substances.

A further object of this invention is to provide improved means for separating and removing the lighter or second scum from semi-syrup after it has entered the finishing apparatus and during the process of boiling, without resorting to the use of hand skimmers with perforated bottoms.

My invention consists in the construction, arrangement and combination of elements hereinafter set forth, pointed out in my claims and illustrated by the accompanying drawing, in which—

Figure 1 is a plan of the apparatus. Fig. 2 is a vertical section on the line 2—2 of Fig. 1. Fig. 3 is a side elevation of the apparatus. Fig. 4 is a vertical section on the line 4—4 of Fig. 1.

In the drawing herewith I have illustrated my improved apparatus in duplicate for the reason that it is more convenient to be able to use one such apparatus while the other is being emptied, cleaned and refilled, thus saving considerable time between successive operations; but it is to be understood that one only of the finishers may be used if desired.

In the construction of the apparatus as shown the numeral 10 designates a boiling tank which is open at its top and supported in any desired manner. A valve-controlled steam pipe 11 leads from a source of steam supply, enters one end of the tank 10 and is arranged in the form of a coil covering approximately the entire bottom of said tank, then leads upward and over the top at the opposite end of said tank to a point of exhaust to the atmosphere, being controlled by a valve 12 near its exit. A skimming tank or separating tank 13 is mounted alongside the boiling tank 10 and the bottom of said skimming tank is elevated relative to the bottom of said boiling tank. An opening 14 forms a communication between the boiling tank and skimming tank near one end, and said opening extends downwardly to the bottom of said skimming tank. A baffle plate 15 extends transversely of the end of the skimming tank opposite to the opening 14 and is inclined upwardly from the bottom toward the top of such end portion of the tank. A drain pipe 16 leads from the bottom of the skimming tank 13 beneath the baffle plate 15. A syrup outlet pipe 17 leads from the bottom of the boiling tank 10 and said pipe is controlled by a valve 18.

In the practical use of the apparatus partially refined or defecated juice is admitted to the boiling tank 10, being received from a defecator such as is illustrated and described in my companion application therefor pending concurrently herewith, filed November 25, 1911, serially numbered 662,440. The juice preferably is admitted to the level of the bottom of the skimming tank 13. Then steam is admitted to and heats the coiled pipe 11 to the end of heating the juice contained in the boiling tank. Such heating has the effect of causing an expansion of the juice, the lighter portions rising to the top and carrying with them the suspended impurities. Such lighter portion of juice and scum flows through the opening 14 and enters the skimming chamber. Here the light juice and scum encounters the baffle plate 15, quickly cools and separates, and the scum is removed at intervals by an operator, who preferably uses a paddle (not shown) to scrape it over said baffle plate, whence it passes off through the drain 16. The remaining juice now cools rapidly because of its relatively large exposed surface, contracts, and passes back as an undercurrent through the opening 14 to the boiling tank. This operation continues repeatedly until the semi-syrup has been entirely purged of its scum and impurities, and after it has been boiled down to the required consistency it may be drawn off through the pipe 17.

I prefer to insert a bar 19 longitudinally of the opening 14 and near the bottom thereof to serve to hold back any floating scum when the last of the juice passes back through said opening to the boiling tank 10 during the last stage of finishing.

The object of elevating the bottom of the skimming or separating compartment slightly above the juice or syrup in the boiling compartment is that at no time will there be a body of juice or syrup in the former chamber to retain the heat, thus insuring a rapid cooling of the liquid and a perfect separation of the impurities from the saccharine matter. For example, when steam is admitted to the coil in the boiling compartment the juice or semi-syrup is heated and expanded and the lighter portions of the juice, scum and impurities are inflated and thrown on top and flow through the opening to the skimming and separating chamber, where they instantly cool and separate. The scum and impurities being inflated and much lighter than the juice, they float to or near the baffle plate where they remain until removed by the operator at intervals. The juice or semi-syrup returns as an undercurrent and the operation is repeated successively to the desired point, when it is free from impurities and comparatively free from water and steam inflation and naturally returns to the boiling compartment and is finished to a uniform density, leaving a superior product, which is clear, sweet and odorless.

I claim as my invention—

1. A syrup finisher, comprising a boiling tank, a steam coil therein, a skimming tank adjacent to said boiling tank, an opening between said tanks, a baffle plate in said skimming tank, and a bar longitudinally of said opening and slightly above the bottom thereof.

2. A syrup finisher, comprising an open boiling tank, valve-controlled steam pipes therein, a skimming tank alongside of said boiling tank, said skimming tank having its bottom elevated relative to the bottom of the boiling tank, a valve-controlled outlet from said boiling tank, an opening between said boiling tank and skimming tank, said opening reaching to the bottom of said skimming tank, and a bar longitudinally of and slightly spaced above the bottom of said opening.

3. A syrup finisher, comprising an open boiling tank, valve-controlled steam pipes therein, a skimming tank alongside of said boiling tank, said skimming tank having its bottom elevated relative to the bottom of the boiling tank, a valve-controlled outlet from said boiling tank, an opening between said boiling tank and skimming tank, said opening reaching to the bottom of said skimming tank, a bar longitudinally of and slightly spaced above the bottom of the opening, an inclined baffle plate in said skimming tank, and a drain leading from said skimming tank.

Signed by me at Des Moines, Iowa, this twentieth day of November, 1911.

MILTON B. CRESSWELL.

Witnesses:
ERLE W. MILLER,
EARL M. SINCLAIR.